(12) United States Patent
Ogawa et al.

(10) Patent No.: US 9,863,675 B2
(45) Date of Patent: Jan. 9, 2018

(54) OIL SEPARATOR AND METHOD FOR PRODUCING OIL SEPARATOR

(71) Applicant: Panasonic Intellectual Property Management Co., Ltd., Osaka (JP)

(72) Inventors: Osamu Ogawa, Saitama (JP); Atsushi Kakimoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 159 days.

(21) Appl. No.: 14/741,449

(22) Filed: Jun. 17, 2015

(65) Prior Publication Data

US 2015/0276288 A1 Oct. 1, 2015

Related U.S. Application Data

(63) Continuation of application No. PCT/JP2014/002830, filed on May 28, 2014.

(30) Foreign Application Priority Data

Jun. 6, 2013 (JP) .................................. 2013-119754

(51) Int. Cl.
*F25B 43/02* (2006.01)
*B04C 5/081* (2006.01)
*B01D 17/02* (2006.01)

(52) U.S. Cl.
CPC .......... *F25B 43/02* (2013.01); *B01D 17/0217* (2013.01); *B04C 5/081* (2013.01); *F25B 2400/02* (2013.01); *Y10T 29/49359* (2015.01)

(58) Field of Classification Search
CPC .... B04C 5/081; Y10T 29/49359; F25B 43/02; F25B 2400/02; B01D 17/0217
See application file for complete search history.

(56) References Cited

U.S. PATENT DOCUMENTS

| 4,756,166 A * | 7/1988 | Tomasov | .............. | F25B 41/062 62/217 |
| 5,437,794 A | 8/1995 | Andersson | | |

(Continued)

FOREIGN PATENT DOCUMENTS

| CN | 1865818 | 11/2006 |
| CN | 101358597 A | 2/2009 |

(Continued)

OTHER PUBLICATIONS

International Search Report of PCT application No. PCT/JP2014/002830 dated Aug. 26, 2014.
The Extended European Search Report dated Jun. 14, 2016 for the related European Patent Application No. 14807168.1.
English Translation of Chinese Search Report dated Dec. 2, 2016 for the related Chinese Patent Application No. 201480002141.5.

(Continued)

*Primary Examiner* — Emmanuel Duke
(74) *Attorney, Agent, or Firm* — McDermott Will & Emery LLP

(57) ABSTRACT

An oil separator includes a cylindrical first separating section having a first inner space where the refrigerant can swirl; a cylindrical second separating section disposed below the first separating section and having a second inner space where the refrigerant can swirl; an introduction tube sending the refrigerant toward an inner wall of the first separating section so that a swirl flow occurs; a delivery tube delivering the separated refrigerant; and an exhaust pipe discharging the separated refrigerant oil, the second separating section having a surface connecting the inner wall of the first separating section and an upper end of an inner wall of the second separating section and forming a step, and an angle between the surface and the inner wall of the first separating section and an angle between the surface and the inner wall of the second separating section being 90 degrees or smaller.

9 Claims, 10 Drawing Sheets

(56) References Cited

U.S. PATENT DOCUMENTS

| | | | |
|---|---|---|---|
| 2002/0134102 A1 | 9/2002 | Morimoto et al. | |
| 2006/0280622 A1* | 12/2006 | Lee | F25B 43/02 417/313 |
| 2009/0031753 A1* | 2/2009 | Yoo | F04C 2/102 62/470 |
| 2009/0035160 A1 | 2/2009 | Yoo et al. | |
| 2012/0132079 A1* | 5/2012 | Naess | B01D 19/0057 96/174 |

FOREIGN PATENT DOCUMENTS

| | | | | |
|---|---|---|---|---|
| CN | 102574027 A | | 7/2012 | |
| EP | 1724537 | | 11/2006 | |
| JP | 7-501482 | | 2/1995 | |
| JP | 11-173706 | | 7/1999 | |
| JP | 2002-061993 | | 2/2002 | |
| JP | 2005-180808 | | 7/2005 | |
| JP | 2006322701 A | * | 11/2006 | B01D 45/16 |
| JP | 2011027293 A | * | 2/2011 | |
| JP | 2013053568 A | * | 3/2013 | F04B 39/023 |
| KR | 100619785 B1 | * | 8/2006 | |
| WO | 1993/010908 | | 6/1993 | |

OTHER PUBLICATIONS

Front Page of Chinese Office Action and English Translation of Chinese Search Report dated Jun. 29, 2017 for the related Chinese Patent Application No. 201480002141.5.

\* cited by examiner

OIL SEPARATOR AND METHOD FOR PRODUCING OIL SEPARATOR

BACKGROUND

1. Technical Field

The present disclosure relates to an oil separator that separates refrigerant oil from a refrigerant containing the refrigerant oil and a method for producing the oil separator.

2. Description of the Related Art

In general, refrigerant oil is used to lubricate a compressor for use in an air-conditioning device or the like. This refrigerant oil circulates through a refrigerant circulatory system together with a refrigerant. The refrigerant oil taken in from the intake side of the compressor is supplied to each slide member provided in the compressor and is used for lubrication of each slide member. In addition, the refrigerant oil is also supplied to a working chamber. The refrigerant oil seals a gap in the working chamber, thereby preventing leak of vaporized refrigerant.

In the circulatory system, in a case where the refrigerant ejected from the compressor contains a large amount of refrigerant oil, the refrigerant oil is likely to adhere to an inner wall surface of a heat-transfer tube of a heat exchanger. The refrigerant oil adhering to the inner wall surface of the heat-transfer tube inhibits heat transfer of the heat-transfer tube and thereby deteriorates the heat-transfer efficiency of the heat exchanger. In order to avoid such a situation, an oil separator is provided in the circulatory system. The oil separator separates the refrigerant oil from the refrigerant ejected from the compressor and brings this refrigerant oil back to the intake side of the compressor.

The high-temperature and high-pressure refrigerant containing refrigerant oil ejected from the compressor is introduced into a cylindrical oil separator so that a swirl flow occurs. A centrifugal force produced by this swirl flow causes the refrigerant oil to adhere to an inner wall surface of the oil separator. This refrigerant oil moves to a lower portion of the oil separator due to gravity and forms an oil pool. In this way, the refrigerant oil is separated from the refrigerant.

However, the aforementioned oil separator has a problem that the refrigerant brings up the refrigerant oil in the oil pool together with the refrigerant and carries the refrigerant oil to the ejection path for the refrigerant. In view of the problem, Japanese Unexamined Patent Application Publication No. 2005-180808 proposes an oil separator that is configured so that an inner diameter of a lower portion of the oil separator is larger than that of an upper portion of the oil separator. This reduces the swirl speed of the swirl flow in the lower portion of the oil separator, thereby keeping the refrigerant from bringing up the refrigerant oil together with the refrigerant.

Furthermore, Japanese Unexamined Patent Application Publication No. 2005-180808 mentions that the inner diameter gradually decreases from the upper portion of the oil separator to the central portion of the oil separator, and the inner diameter gradually increases from the central portion of the oil separator to the lower portion of the oil separator. According to Japanese Unexamined Patent Application Publication No. 2005-180808, this increases the swirl speed of the swirl flow in the central portion of the oil separator and rectifies the flow, thereby achieving a good separating property.

SUMMARY

However, the separating property of the conventional oil separator is not sufficient.

One non-limiting and exemplary embodiment provides an oil separator that has an improved refrigerant oil separating property and a method for producing the oil separator.

In one general aspect, the techniques disclosed here feature an oil separator that separates refrigerant oil from a refrigerant containing the refrigerant oil, including: a first separating section that has a cylindrical shape and that has a first inner space in which the refrigerant is capable of swirling by which refrigerant oil is at least partially separated from refrigerant; a second separating section that is disposed below the first separating section, the second separating section having a cylindrical shape and having a second inner space in which the refrigerant that has flowed out from the first separating section is capable of swirling by which refrigerant oil is at least partially separated from refrigerant; an introduction tube that causes a swirl flow of the refrigerant to occur in the first inner space by causing the refrigerant to flow out toward an inner wall surface of the first separating section; a delivery tube that delivers the refrigerant from which the refrigerant oil has been separated; and an exhaust pipe that discharges, from the second inner space, the refrigerant oil separated from the refrigerant, the second separating section having a surface that connects the inner wall surface of the first separating section and an upper end of an inner wall surface of the second separating section and that forms a step, and an angle between the surface and the inner wall surface of the first separating section being 90 degrees or smaller and an angle between the surface and the inner wall surface of the second separating section being 90 degrees or smaller.

The oil separator according to the present disclosure has an improved refrigerant oil separating property.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

As a result of diligent studies, the inventors of the present disclosure found that, in an oil separator utilizing a centrifugal force produced by a swirl flow, it is important for a refrigerant containing refrigerant oil to swirl for as long a time as possible in the oil separator. According to the oil separator disclosed in Japanese Unexamined Patent Application Publication No. 2005-180808, it is difficult to improve a swirling time in an upper space of the oil separator that contributes to oil separation.

An embodiment of the present disclosure is described below in detail with reference to the drawings. Note that the embodiment described below is merely an example, and the present disclosure is not limited by this embodiment.

Figure 1:
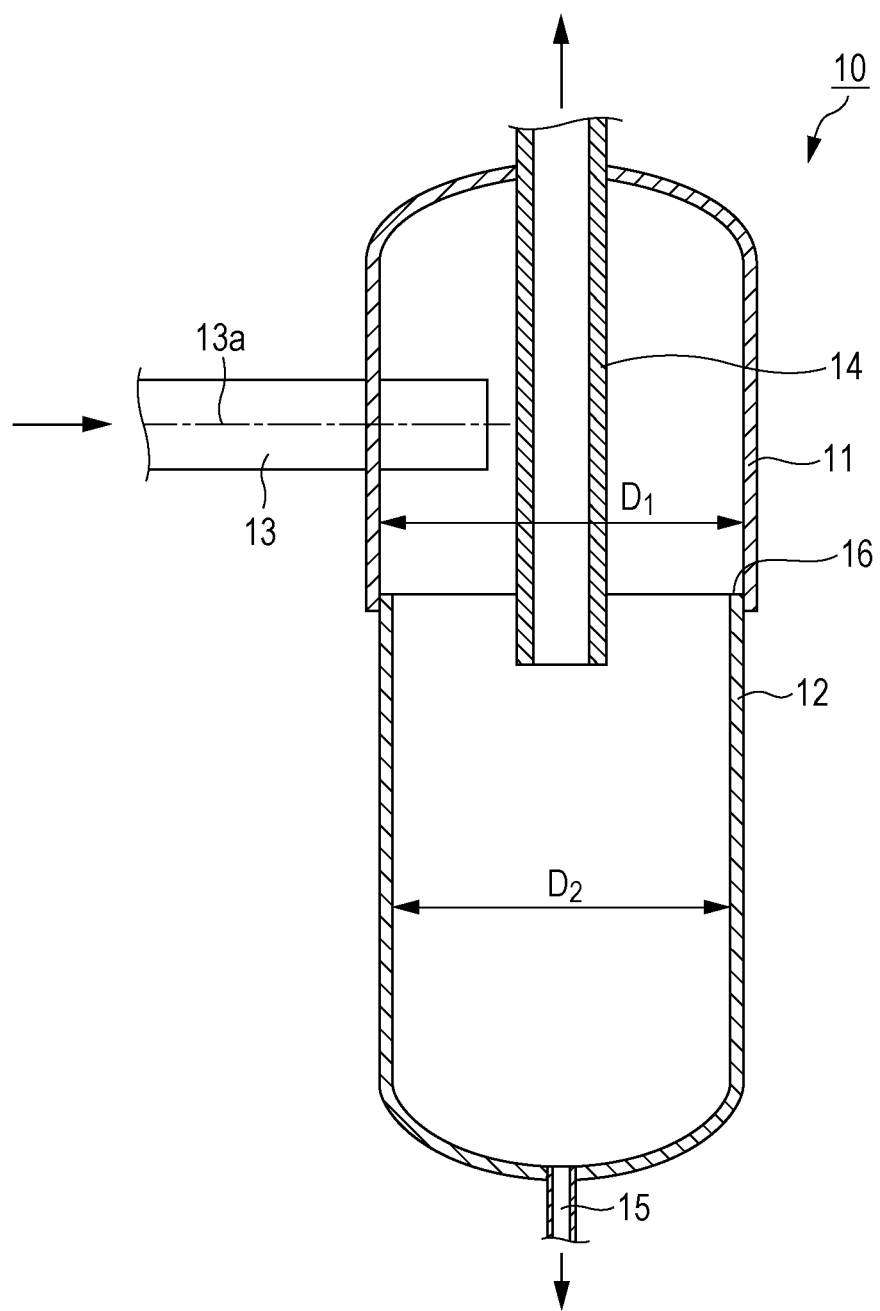
FIG. 1 is a view illustrating an example of a configuration of an oil separating device according to an embodiment of the present disclosure.

FIG. 1 is a view illustrating an example of a configuration of an oil separator 10 according to the embodiment of the present disclosure. The oil separator 10 is a device that separates refrigerant oil from a refrigerant containing the refrigerant oil. The oil separator 10 includes a first separating section 11, a second separating section 12, an introduction tube 13, a delivery tube 14, and an exhaust pipe 15. FIG. 1 illustrates a cross section of the oil separator 10 taken along a plane that passes through the center of the oil separator 10 and that is parallel with a tube axis 13a of the introduction tube 13.

The first separating section 11 and the second separating section 12 are cylindrical containers each having an inner space in which the refrigerant is capable of swirling. The second separating section 12 is provided below the first separating section 11. An inner diameter D2 of the second separating section 12 is smaller than an inner diameter D1 of the first separating section 11. This allows the swirling speed that has decreased during swirling in the first separating section 11 to be increased in the second separating section 12, thereby improving the efficiency of oil separation.

The introduction tube 13 and the delivery tube 14 are provided so as to penetrate the first separating section 11. The introduction tube 13 allows the refrigerant containing refrigerant oil to flow out towards the inner wall surface of the first separating section 11, thereby producing a swirl flow of the refrigerant. The delivery tube 14 delivers, from the oil separator 10, the refrigerant from which the refrigerant oil has been separated.

The refrigerant oil contained in the refrigerant adheres to the inner wall surface of the oil separator 10 due to the action of a centrifugal force produced by the swirl flow of the refrigerant. Thus, the refrigerant oil is separated from the refrigerant. Then, the refrigerant oil separated from the refrigerant moves to the bottom of the second separating section 12 due to gravity.

An net of the delivery tube 14 is desirably placed inside the second separating section 12. This makes it possible to narrow an inner space of the second separating section 12 on the first separating section 11 side, thereby further increasing the swirling speed of the refrigerant flow in the second separating section 12.

The exhaust pipe 15 is provided so as to penetrate the second separating section 12. The exhaust pipe 15 allows the refrigerant oil that has moved to the bottom of the second separating section 12 to exit from the oil separator 10. The refrigerant oil that has exited from the oil separator 10 is brought back again to the intake side of the compressor.

Since the refrigerant ejected from the compressor has a high temperature, the refrigerant oil that has moved to the bottom of the second separating section 12 can be brought back to an oil pool of a high temperature in a hermetically-sealed container of the compressor if the refrigerant oil that has moved to the bottom of the second separating section 12 has a high temperature. According to this arrangement, efficient operation of the compressor is possible.

The second separating section 12 is provided so as to face the inner space of the first separating section 11. The second separating section 12 has a surface 16 that connects the inner wall surface of the first separating section 11 and an upper end of the inner wall surface of the second separating section 12. The angle between the surface 16 and the inner wall surface of the first separating section 11 is set to 90 degrees or less, and the angle between the surface 16 and the inner wall surface of the second separating section 12 is also set to 90 degrees or less.

Accordingly, the first separating section 11 and the second separating section 12 form a step. That is, the inner diameter of the oil separator 10 rapidly changes at a boundary between the first separating section 11 and the second separating section 12.

Figure 2A:
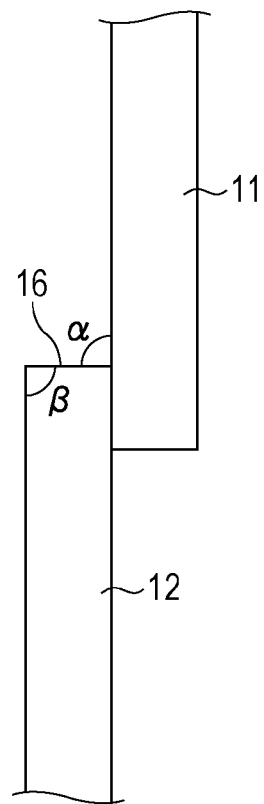
FIG. 2A is a view for explaining angles of a surface of a step.
Figure 2B:
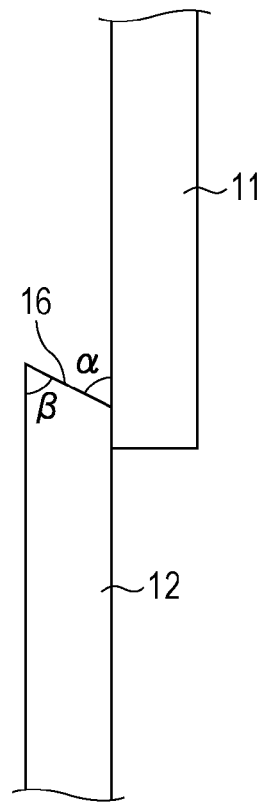
FIG. 2B is a view for explaining angles of a surface of a step.

FIG. 2 is a view for explaining angles of the surface 16 of the step. In FIG. 2, the angle between the surface 16 of the step and the inner wall surface of the first separating section 11 is indicated by α and the angle between the surface 16 of the step and the inner wall surface of the second separating section 12 is indicated by β. FIG. 2A illustrates a case where both of the angles α and β are 90 degrees, and FIG. 2B illustrates a case where both of the angles α and β are smaller than 90 degrees.

By setting the angles of the surface 16 of the step to these angles, the direction of flow of the refrigerant in the vicinity of the wall of the container can be changed from a downward direction to a horizontal direction or to a direction pointing upward away from the horizontal direction. This makes it possible to prolong the duration of swirling of the refrigerant in the first separating section 11, thereby promoting separation of the refrigerant oil from the refrigerant. Note that the following describes a case where both of the angles α and β are 90 degrees.

Figure 3:
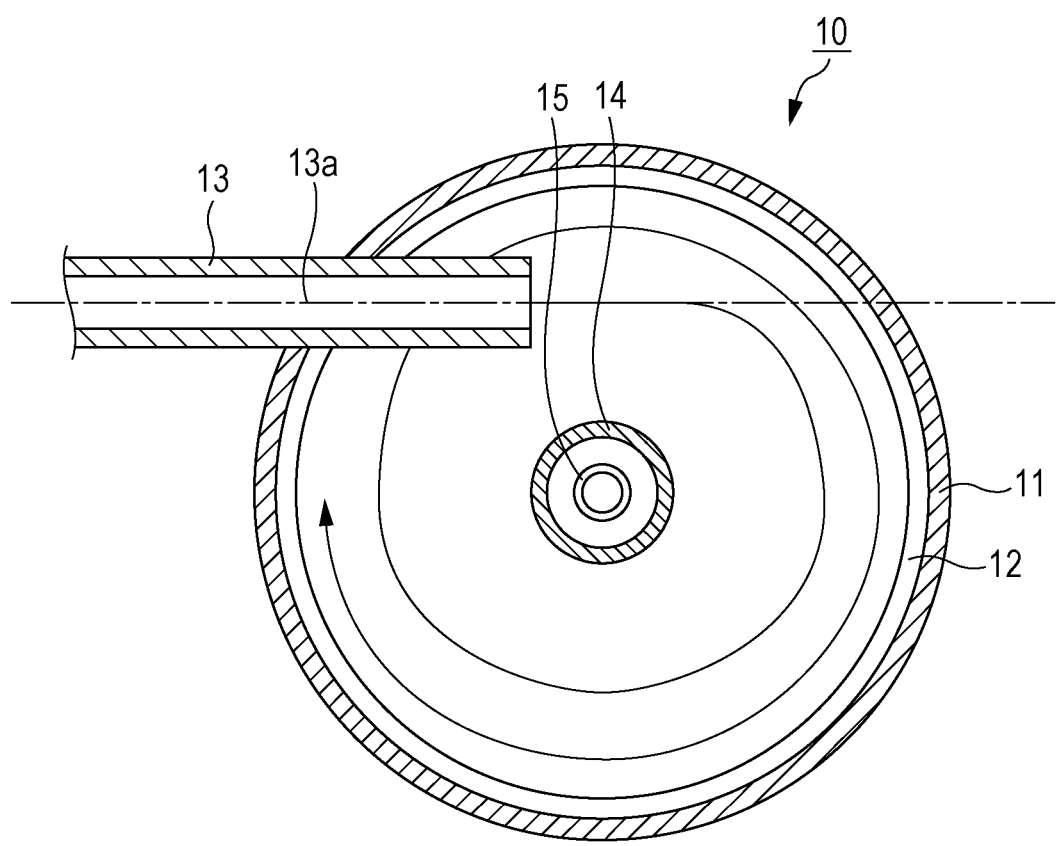
FIG. 3 is a view for explaining an example of the way in which an introduction tube is disposed.

FIG. 3 is a view for explaining an example of the way in which the introduction tube 13 is disposed. FIG. 3 is a cross-sectional view of the oil separator 10 taken along a horizontal plane that passes the tube axis 13a of the introduction tube 13. As illustrated in FIG. 3, the direction of the tube axis 13a of the introduction tube 13 is deviated from the center direction of the first separating section 11.

Accordingly, the refrigerant that has flowed out from the introduction tube 13 collides with the inner wall surface of the first separating section 11 from an oblique direction. This produces a swirl flow of the refrigerant. Then, the refrigerant oil contained in the refrigerant is separated from the refrigerant due to the action of the centrifugal force produced by this swirl flow. The refrigerant oil separated from the refrigerant adheres to the inner wall surface of the oil separator.

The oil separator 10 described above can be very easily produced. Specifically, it is only necessary to insert the second separating section 12 into the first separating section 11 and to use, as the surface 16 of the step, an upper end of the wall surface of the second separating section 12. It is possible to achieve a reduction in cost of the device by employing such a production method.

In FIGS. 1 and 3, the introduction tube 13 is disposed laterally. Note, however, that the introduction tube 13 may be disposed longitudinally. In this case, in order to produce a swirl flow of the refrigerant, it is only necessary to bend a front end of the introduction tube 13 in a substantially horizontal direction in the first separating section 11.

Next, a relationship between the inner diameter of the first separating section 11 and the inner diameter of the second separating section 12 is described on the basis of a result of the property analysis of the oil separator 10. FIG. 4 is a view for explaining parameters used for the property analysis of the oil separator 10.

Figure 4A:
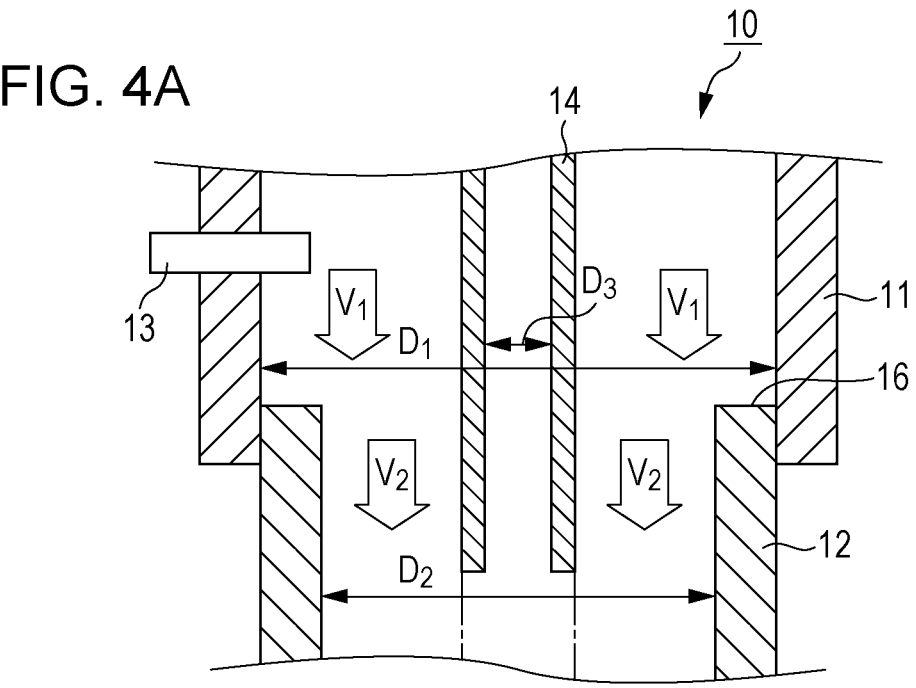
FIG. 4A is a view for explaining parameters used for property analysis of the oil separator.

As illustrated in FIG. 4A, it is assumed that the inner diameter of the first separating section 11 is $D_1$ (m), the inner diameter of the second separating section 12 is $D_2$ (m), and the inner diameter of the delivery tube 14 is $D_3$ (m). Furthermore, it is assumed that the average descent speed of the refrigerant in the space of the first separating section 11 from the height of the central axis of the introduction tube 13 to the height of the surface 16 of the step is $V_1$ (m/s) and that the average descent speed of the refrigerant in the space of the second separating section 12 from the height of the surface 16 of the step to the height of the inlet of the delivery tube 14 is $V_2$ (m/s).

Figure 4B:
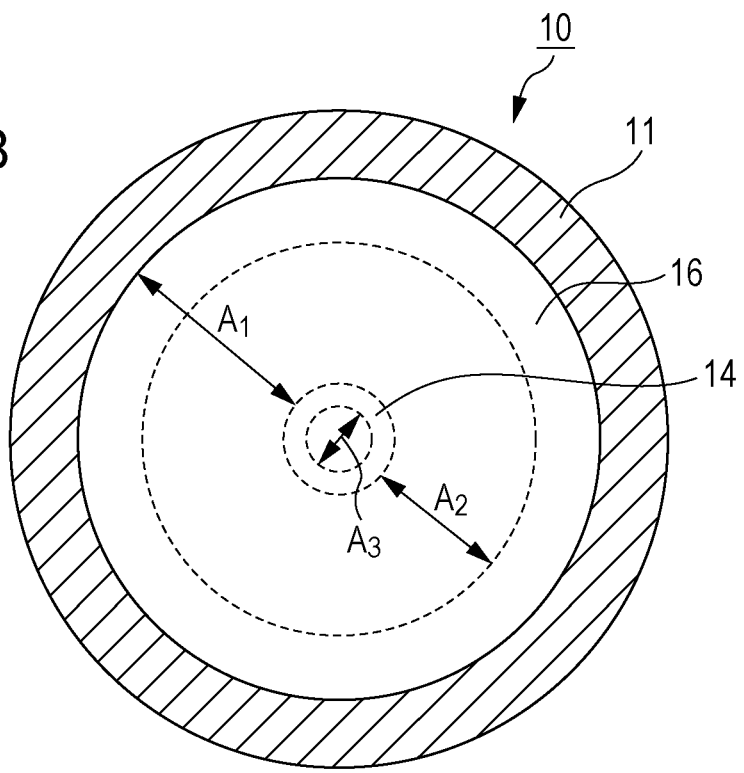
FIG. 4B is a view for explaining parameters used for property analysis of the oil separator.

As illustrated in FIG. 4B, it is assumed that the area obtained by subtracting the area occupied by the delivery tube 14 from the area of the inner region of the first separating section 11 in a horizontal cross section of the oil separator 10 is $A_1$, the area obtained by subtracting the area occupied by the delivery tube 14 from the area of the inner region of the second separating section 12 is $A_2$, and the area occupied by the delivery tube 14 is $A_3$.

In this case, the areas $A_1$ through $A_3$ are expressed as follows:

$$A_1 = \pi(D_1/2)^2 - \pi(D_3/2)^2 \qquad \text{equation 1}$$

$$A_2 = \pi(D_2/2)^2 - \pi(D_3/2)^2 \qquad \text{equation 2}$$

$$A_3 = \pi(D_3/2)^2 \qquad \text{equation 3}$$

Moreover, assuming that the amount of refrigerant introduced from the introduction tube 13 is Q (m³/s) and that the refrigerant flows only in a downward direction in the space from the height of the central axis of the introduction tube 13 to the height of the net of the delivery tube 14, the following equation is established:

$$Q = A_1 V_1 = A_2 V_2 \qquad \text{equation 4}$$

A pressure loss ΔPs that occurs due to the step as illustrated in FIG. 4 can be estimated by the following equation:

$$\Delta Ps = 0.5 \zeta \rho V_2^2 \qquad \text{equation 5}$$

Since the area $A_3$ is smaller than the areas $A_1$ and $A_2$ and does not have a large influence on the flow of the refrigerant, the presence of the delivery tube 14 is ignored in equation 5.

In equation 5, $\zeta$ is a loss coefficient that changes in accordance with the area ratio $A_2/A_1$ and is obtained by way of experiment. Specifically, in a case where $A_2/A_1$ is 0, 0.01, 0.1, 0.2, 0.4, 0.6, 0.8, or 1.0, values of $\zeta$ that correspond to these values of $A_2/A_1$ are 0.5, 0.449, 0.372, 0.372, 0.292, 0.185, 0.09, and 0.

Figure 5:
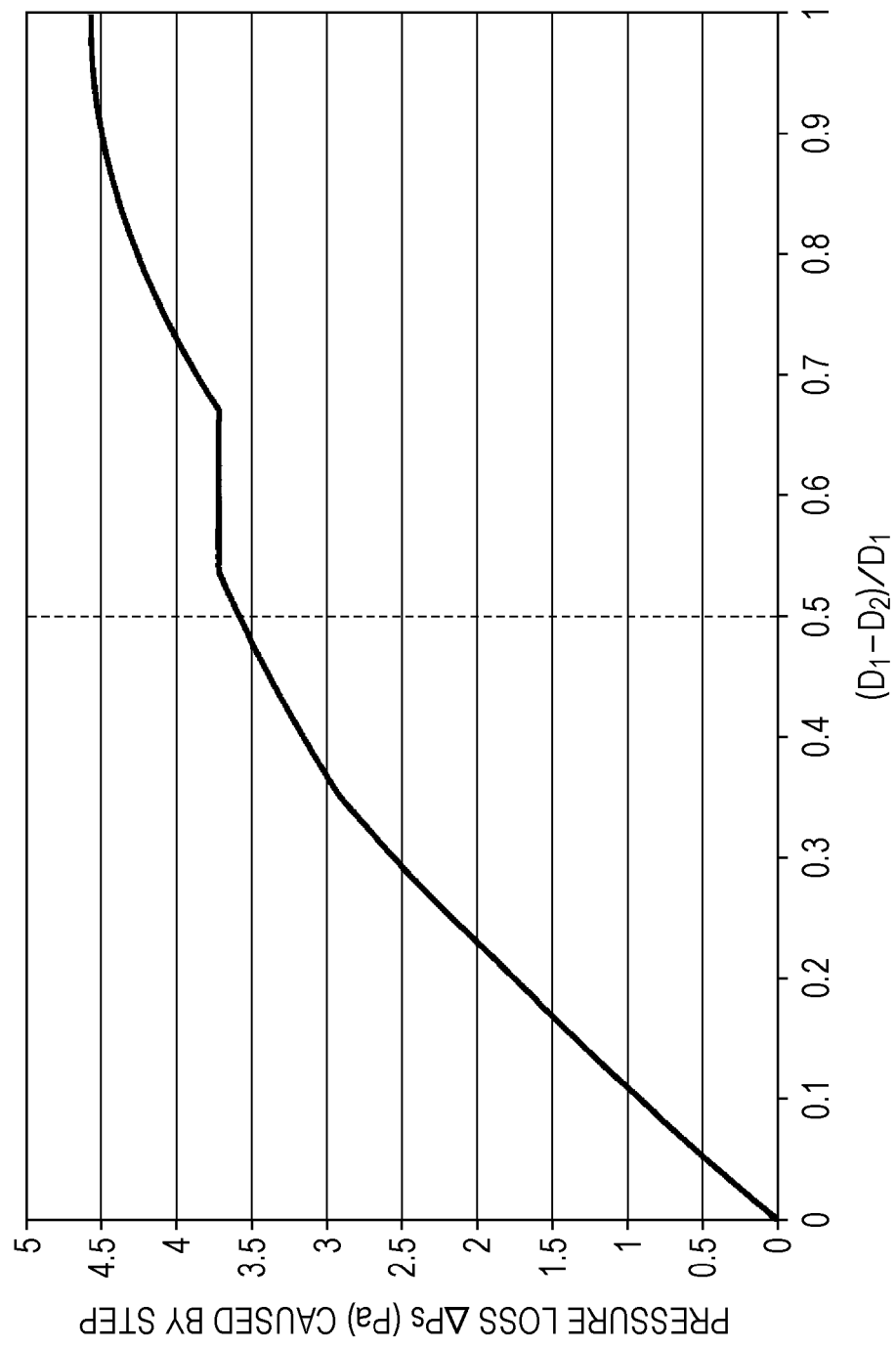
FIG. 5 is a view illustrating a relationship between a pressure loss $\Delta PS$ and a ratio $(D_1-D_2)/D_1$.

FIG. 5 is a view illustrating a relationship between the pressure loss ΔPs derived by using equations 1 through 5 and a ratio $(D_1-D_2)/D_1$. In calculating the pressure loss ΔPs, the density ρ of the refrigerant was set to 90.6 kg/m³. This density is a density of a refrigerant R410A at 88.5 degrees C. The amount Q of introduced refrigerant was set to 0.0015 m³/s. The calculation was performed by setting the inner diameter $D_2$ of the second separating section 12 to 0.067 m, fixing the diameter $D_3$ of the delivery tube 14 to 0.019 m, and changing the inner diameter $D_1$ of the first separating section 11.

The pressure loss that occurs in the oil separator 10 is several tens of kPa. Meanwhile, a pressure loss ΔPs that occurs due to the step is several Pa, which is a value that can be ignored as compared with the pressure loss that occurs in the oil separator 10. However, this slight increase in the pressure loss suppresses descent of the refrigerant and works to maintain the swirl flow of the refrigerant in the space of the first separating section 11.

This will be described. The refrigerant that is introduced into the inner space of the first separating section 11 through the introduction tube 13 collides with the inner wall surface of the first separating section 11 and flows in all directions along the inner wall surface. Then, the refrigerant that flows in a downward direction collides with the surface 16 of the step. This increases the pressure in the vicinity of the surface 16, which in turn, inhibits flow of the refrigerant in the downward direction, thereby allowing the refrigerant to swirl for a long time in the first separating section 11. As a result, separation of the refrigerant oil from the refrigerant is promoted.

As is clear from FIG. 5, when the ratio $(D_1-D_2)/D_1$ exceeds approximately 0.5, the inclination of the tangent to the graph of ΔPs rapidly decreases. That is, even if the ratio $(D_1-D_2)/D_1$ becomes larger than this value, a large increase in the pressure loss cannot be expected.

To increase the ratio $(D_1-D_2)/D_1$, the inner diameter $D_1$ of the first separating section 11 is further increased or the inner diameter $D_2$ of the second separating section 12 is further reduced. However, from the perspective of a reduction of the width of the oil separator 10, it is desirable that the inner diameter $D_1$ of the first separating section 11 be small. Furthermore, from the perspective of suppression of the pressure loss that occurs in the second separating section 12, it is desirable that the inner diameter $D_2$ of the second separating section 12 be not so small.

Therefore, it is desirable that the relationship between the inner diameter $D_1$ of the first separating section 11 and the inner diameter $D_2$ of the second separating section 12 be $$(D_1-D_2)/D_1 \leq 0.5 \qquad \text{equation 6}$$

In other words, it is desirable that the relationship between the inner diameter $D_1$ of the first separating section 11 and the inner diameter $D_2$ of the second separating section 12 be $$2 \leq D_1/(D_1-D_2) \qquad \text{equation 7}$$

Figure 6:
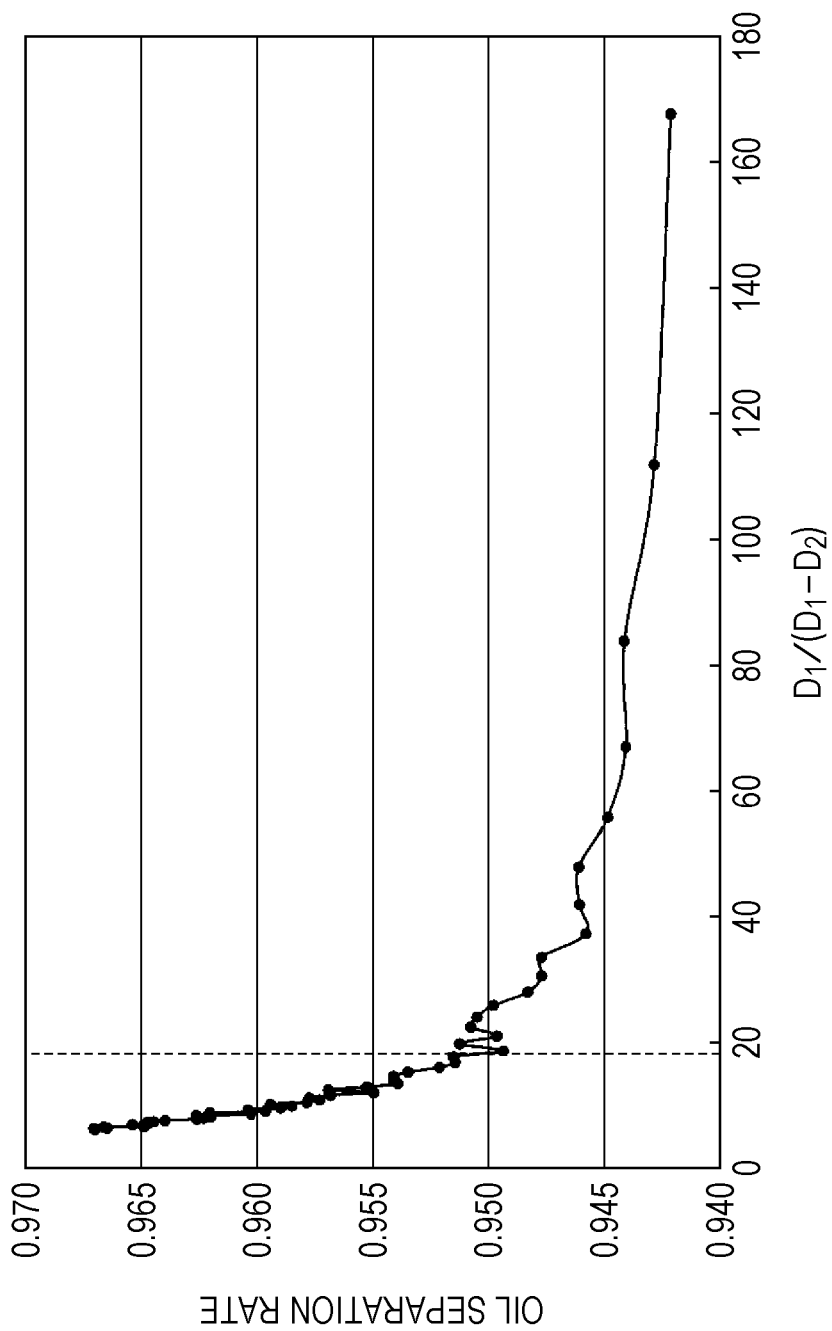
FIG. 6 is a view illustrating a relationship between an oil separation rate and a ratio $D_1/(D_1-D_2)$.

Next, a relationship between an oil separation rate obtained by modeling a motion equation by which an oil droplet of the refrigerant oil moves in a radial direction by the centrifugal force produced by the swirl flow and the ratio $D_1/(D_1-D_2)$ is described. FIG. 6 is a view illustrating a relationship between the oil separation rate and the ratio $D_1/(D_1-D_2)$. The oil separation rate is one obtained by numerical experiments by using a prediction method proposed by Murakami et al. (Murakami, Wakamoto, Morimoto, "Performance Prediction of a Cyclone Oil Separator", Transactions of Japan Society of Refrigerating and Air Conditioning Engineers, Vol. 22 (3), pp. 315-324, Sep. 30, 2005).

Specifically, the diameter of the oil droplet of the refrigerant oil was determined by using the Monte Carlo method so as to be within several tens of μm. Furthermore, it was determined from which position of the outlet of the introduction tube 13 the droplet was introduced. Then, the change in oil separation rate was examined while changing the ratio $D_1/(D_1-D_2)$. The density $\rho$ of the refrigerant was set to 90.6 kg/m$^3$, the amount of introduced refrigerant was set to 0.0015 m$^3$/s, the height of the first separating section 11 was set to 0.12 m, and the height of the second separating section 12 was set to 0.22 m.

As is clear from FIG. 6, when the ratio $D_1/(D_1-D_2)$ becomes 18 or smaller, the oil separation rate rapidly increases. That is, it is desirable that the ratio $D_1/(D_1-D_2)$ satisfy the following relationship:

$$D_1/(D_1-D_2) \leq 18 \qquad \text{equation 8}$$

Figure 7:
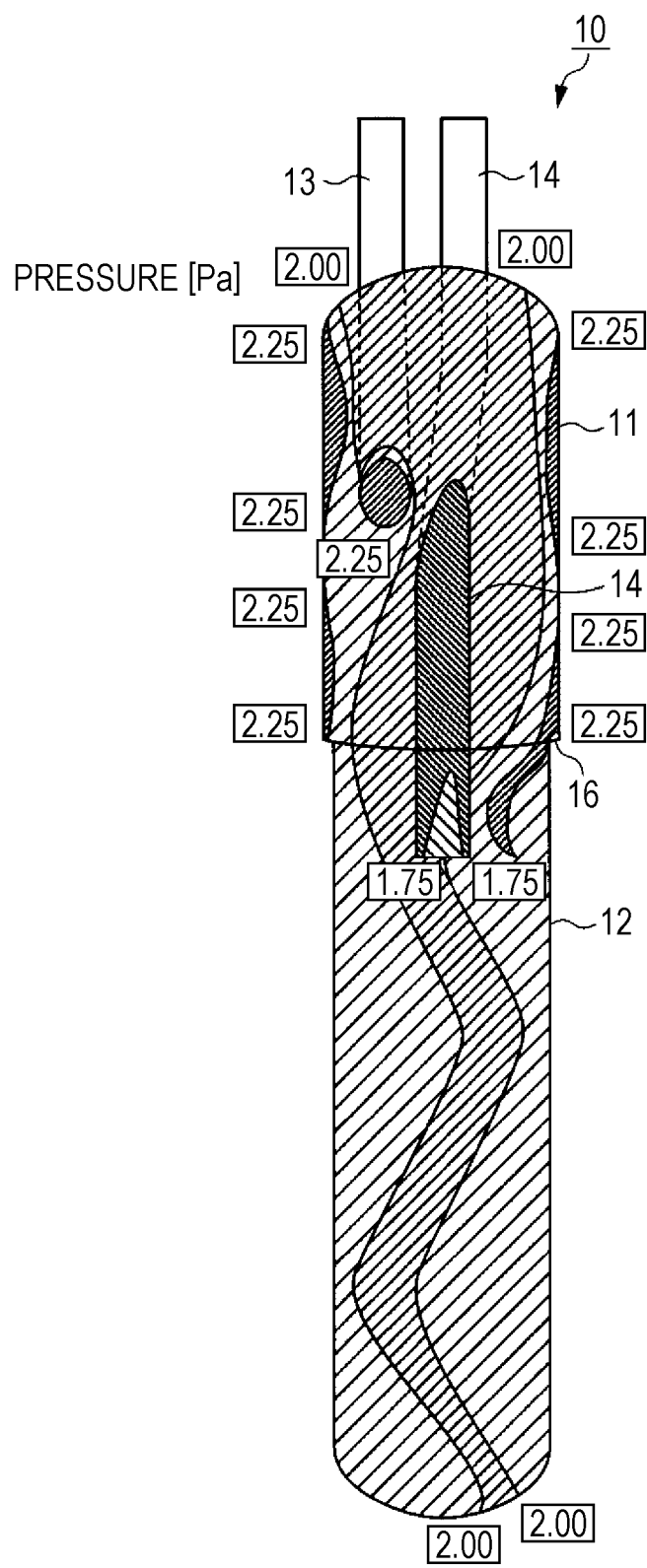
FIG. 7 is a view illustrating an example of a pressure distribution of an oil separator having a step.

Next, an example of a pressure distribution of the oil separator 10 having a step is described. FIG. 7 is a view illustrating an example of a pressure distribution of the oil separator 10 having a step. FIG. 7 illustrates a result obtained by computational fluid dynamics (CFD).

In FIG. 7, each of the values surrounded by the rectangles is a pressure (Pa) of a line of equal pressure. A pressure specifying condition is set on an upper end surface of the delivery tube 14 in FIG. 7 as an outlet boundary condition of an analysis region, and the pressure on this upper end surface is set to 0 (standard pressure). In the example of FIG. 7, the introduction tube 13 is disposed laterally, but the front end portion of the introduction tube 13 is bent in a substantially horizontal direction in the first separating section 11.

As is clear from FIG. 7, the pressure in the vicinity of the surface 16 of the step is higher than that in a peripheral region around the surface 16 of the step. Accordingly, the direction of flow of the refrigerant changes from the downward direction to the horizontal direction. Thus, the flow of the refrigerant in the downward direction is inhibited.

Figure 8:
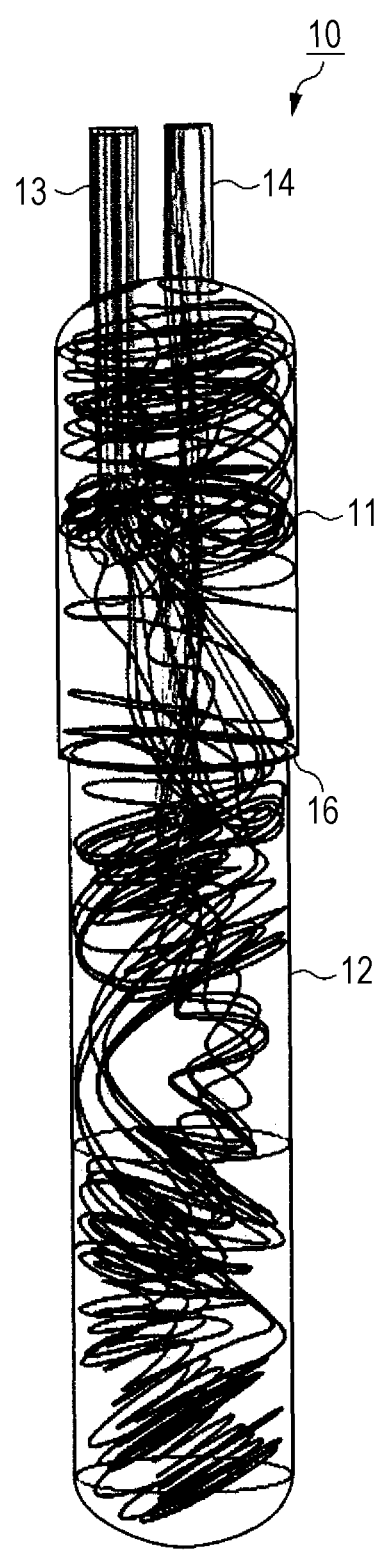
FIG. 8 is a view illustrating a flow line of an oil droplet of refrigerant oil under the pressure distribution illustrated in FIG. 7.

FIG. 8 is a view illustrating a flow line of an oil droplet of the refrigerant oil under the pressure distribution illustrated in FIG. 7. FIG. 8 illustrates a result obtained by DPM (Discrete Phase Model) analysis. FIG. 8 illustrates how the direction of flow of the refrigerant changes due to the presence of a high-pressure region in the vicinity of the surface 16 of the step.

In a case where the volume Vol of the oil separator 10 is set constant, it is desirable that the inner diameter $D_1$ of the first separating section 11 satisfy the following relationship:

$$0.060 \text{ (m)} \leq D1 \leq 0.095 \text{ (m)} \qquad \text{equation 9}$$

Making the volume Vol constant means that the cost of materials for the oil separator 10 becomes almost constant. The following describes the derivation of this relationship.

It is assumed here that the volume Vol of the oil separator 10 is 0.0016 m$_3$ and that the inner diameter $D_2$ of the second separating section 12 is smaller than the inner diameter $D_1$ of the first separating section 11 by 0.006 m. Furthermore, it is assumed that the height of the first separating section 11 is 0.100 m and that the inner diameter $D_3$ of the delivery tube 14 is 0.019 m.

Figure 9:
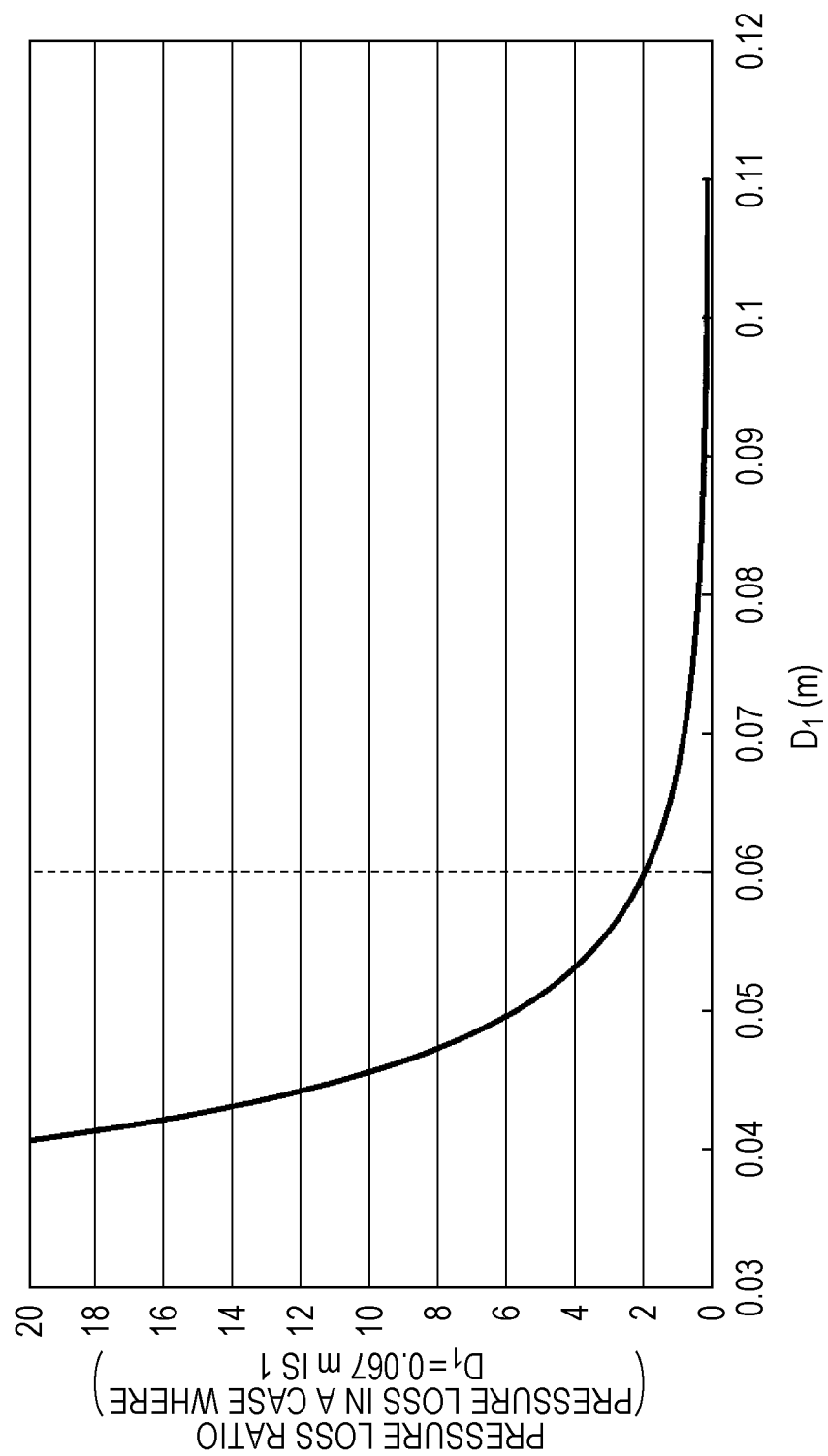
FIG. 9 is a view illustrating a relationship between a pressure loss ratio and an inner diameter $D_1$ of a first separating section.

FIG. 9 is a view illustrating a relationship between a pressure loss ratio and the inner diameter $D_1$ of the first separating section 11. The pressure loss ratio is a ratio $\Delta Pt/\Delta Pt'$, which is a ratio of the pressure loss $\Delta Pt$ to a pressure loss $\Delta Pt'$ obtained in a case where $D_1$ is 0.067 m.

The pressure loss $\Delta Pt$ and the pressure loss $\Delta Pt'$ are calculated by adding the pressure loss that occurs in cylindrical tube flow in the first separating section 11 and the pressure loss that occurs in cylindrical tube flow in the second separating section 12. Note that evaluation of the pressure loss $\Delta Pt$ and the pressure loss $\Delta Pt'$ except for the pressure loss that occurs due to a step or the like is conducted.

In this case, the pressure loss $\Delta Pt$ can be approximated by the following equation:

$$\Delta Pt = (\lambda h_1/D_1 \times 0.5\rho V_1^2 + \lambda h_2/D_2 \times 0.5\rho V_2^2) \qquad \text{equation 10}$$

where $h_1$ and $h_2$ are the height from the central axis of the introduction tube 13 in the first separating section 11 to the surface 16 of the step and the height of the second separating section 12, respectively, and $\lambda$ is a coefficient of pipe friction.

The pressure loss $\Delta Pt/\Delta Pt'$ can be calculated by using equation 10 and equation 4 as follows:

$$\Delta Pt/\Delta Pt' = \{h_1/D_1 \times (1/A_1)^2 + h_2/D_2 \times (1/A_2)^2\}/\{h_1/D_1 \times (1/A_1)^2 + h_2/D_2 \times (1/A_2)^2\}' \qquad \text{equation 11}$$

In equation 11, $\{h_1/D_1 \times (1/A_1)^2 + h_2/D_2 \times (1/A_2)^2\}'$ is a value of $\{h_1/D_1 \times (1/A_1)^2 + h_2/D_2 \times (1/A_2)^2\}$ obtained in a case where $D_1$ is 0.067 m. $A_1$ and $A_2$ are calculated by using equations 1 and 2. Since the volume Vol of the oil separator 10 is constant, the following relationship is satisfied:

$$\text{Vol} = h_1 A_1 + h_2 A_2 = \text{constant} \qquad \text{equation 12}$$

A result of calculation of the pressure loss ratio $\Delta Pt/\Delta Pt'$ using the above relationship is illustrated in FIG. 9. As is clear from FIG. 9, when $D_1$ becomes approximately 0.060 (m) or smaller, the pressure loss ratio rapidly increases. A large pressure loss ratio is not preferable since a compressor that has higher ejection capability is needed to circulate the refrigerant.

It is therefore desirable that the inner diameter $D_1$ of the first separating section 11 satisfy the following relationship:

$$0.060 \text{ (m)} \leq D1 \qquad \text{equation 13}$$

Figure 10:
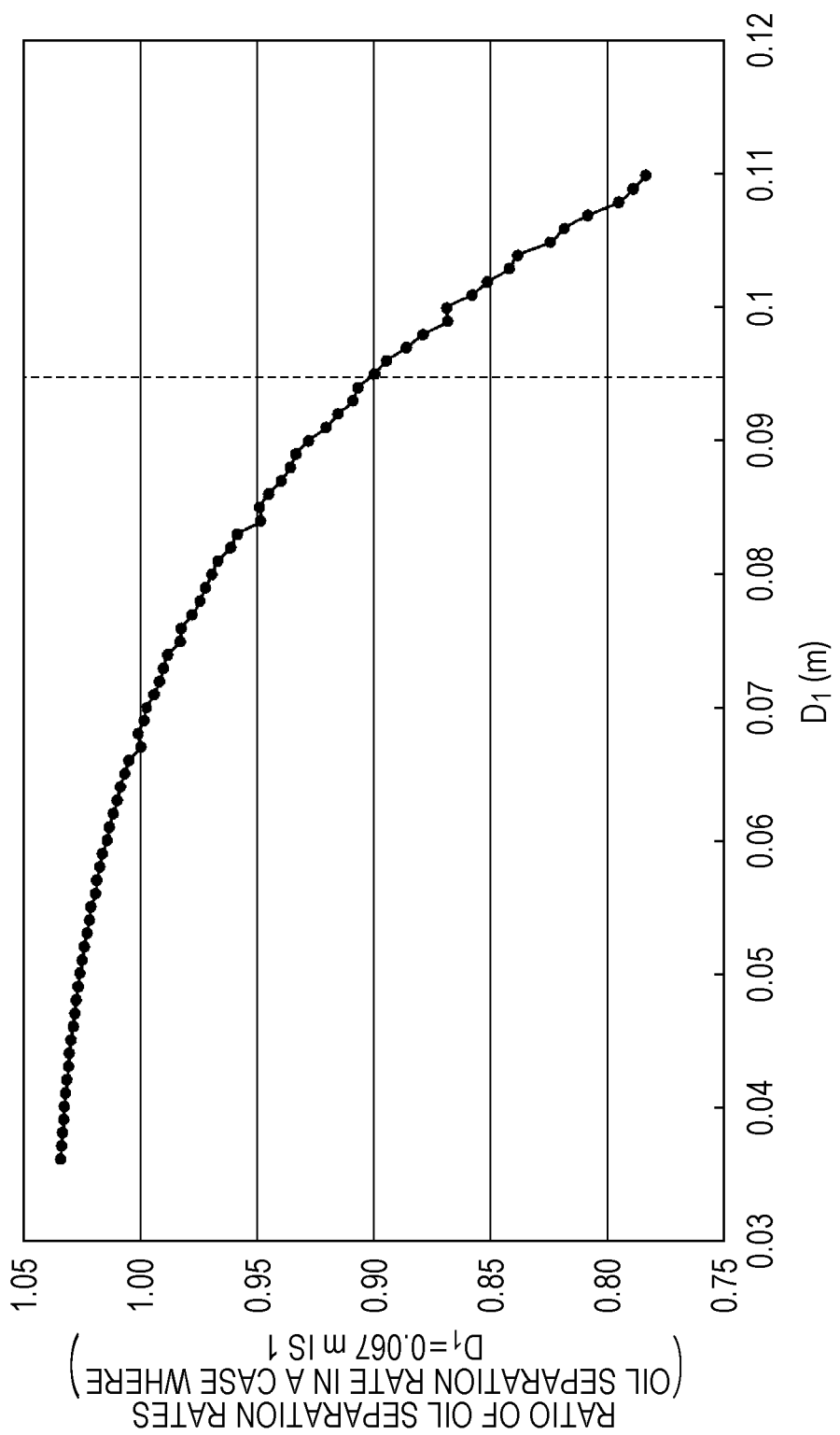
FIG. 10 is a view illustrating a relationship between a ratio between oil separation rates and the inner diameter $D_1$ of the first separating section.

FIG. 10 is a view illustrating a relationship between a ratio of oil separation rates and the inner diameter $D_1$ of the first separating section 11. The ratio of the oil separation rates is a ratio SO/SO', which is a ratio of an oil separation rate SO to an oil separation rate SO' obtained in a case where $D_1$ is 0.067 m. The model of the oil separator 10 is identical to that in the case of FIG. 9. The oil separation rates were obtained by numerical experiments by using the same method as that in the case of FIG. 6.

As is clear from FIG. 10, when $D_1$ becomes approximately 0.095 (m) or larger, the ratio of the oil separation rates rapidly decreases. It is therefore desirable that the inner diameter $D_1$ of the first separating section 11 satisfy the following relationship:

$$D_1 \leq 0.095 \text{ (m)} \qquad \text{equation 14}$$

The relationship of equation 9 is obtained by using equations 13 and 14.

As described above, according to the present embodiment, it is possible to prolong a swirling time of a refrigerant containing refrigerant oil in the first separating section 11, thereby improving a separation property of the refrigerant oil.

INDUSTRIAL APPLICABILITY

An oil separator according to the present disclosure is suitably used as an oil separator that separates refrigerant oil from a refrigerant containing the refrigerant oil for lubricating a compressor used in an air-conditioning device or the like, and a method for producing an oil separator according to the present disclosure is suitably used for production of the above oil separator.

What is claimed is:

1. An oil separator that separates refrigerant oil from a refrigerant containing the refrigerant oil, comprising:
    a first separating section that has a cylindrical shape and that has a first inner space in which the refrigerant is capable of swirling by which refrigerant oil is at least partially separated from refrigerant;
    a second separating section that is disposed below the first separating section, the second separating section having a cylindrical shape and having a second inner space in which the refrigerant that has flowed out from the first separating section is capable of swirling by which refrigerant oil is at least partially separated from refrigerant;
    an introduction tube that causes a swirl flow of the refrigerant to occur in the first inner space by causing the refrigerant to flow out toward an inner wall surface of the first separating section;
    a delivery tube that delivers the refrigerant from which the refrigerant oil has been separated; and
    an exhaust pipe that discharges, from the second inner space, the refrigerant oil separated from the refrigerant,
    the second separating section having a surface that connects the inner wall surface of the first separating section and an upper end of an inner wall surface of the second separating section and that forms a step,
    wherein an angle between the surface and the inner wall surface of the first separating section is less than 90 degrees, and
    an angle between the surface and the inner wall surface of the second separating section is less than 90 degrees.

2. The oil separator according to claim 1, wherein the following relationship is satisfied:

$$2 \leq D_1/(D_1-D_2) \leq 18$$

where $D_1$ is an inner diameter of the first separating section, and $D_2$ is an inner diameter of the second separating section.

3. The oil separator according to claim 1, wherein the delivery tube includes at least a portion which extends into the second inner space to be surrounded by the second separating section.

4. A method for producing an oil separator that separates refrigerant oil from a refrigerant containing the refrigerant oil,
    the oil separator including:
    a first separating section that has a cylindrical shape and that has a first inner space in which the refrigerant is capable of swirling by which refrigerant oil is at least partially separated from refrigerant;
    a second separating section that is disposed below the first separating section, the second separating section having a cylindrical shape and having a second inner space in which the refrigerant that has flowed out from the first separating section is capable of swirling by which refrigerant oil is at least partially separated from refrigerant;
    an introduction tube that causes a swirl flow of the refrigerant to occur in the first inner space by causing the refrigerant to flow out toward an inner wall surface of the first separating section;
    a delivery tube that delivers the refrigerant from which the refrigerant oil has been separated; and
    an exhaust pipe that discharges, from the second inner space, the refrigerant oil separated from the refrigerant,
    the second separating section having a surface that connects the inner wall surface of the first separating section and an upper end of an inner wall surface of the second separating section and that forms a step,
    wherein an angle between the surface and the inner wall surface of the first separating section is less than 90 degrees, and
    an angle between the surface and the inner wall surface of the second separating section is less than 90 degrees,
    the method comprising inserting the second separating section into the first separating section so that an upper end surface of the second separating section serves as the surface.

5. The oil separator according to claim 1, wherein the following relationship is satisfied:

$$D_1 > D_2,$$

where $D_1$ is an inner diameter of the first separating section, and $D_2$ is an inner diameter of the second separating section.

6. The oil separator according to claim 5, wherein the delivery tube is placed inside the second separating section in a cross section taken along a plane that passes through a center of the oil separator.

7. The method for producing an oil separator according to claim 4, wherein the following relationship is satisfied:

$$D_1 > D_2,$$

where $D_1$ is an inner diameter of the first separating section, and $D_2$ is an inner diameter of the second separating section.

8. The method for producing an oil separator according to claim 7, wherein the delivery tube is placed inside the second separating section in a cross section taken along a plane that passes through a center of the oil separator.

9. The method for producing an oil separator according to claim 4, wherein the delivery tube includes at least a portion which extends into the second inner space to be surrounded by the second separating section.

* * * * *